United States Patent [19]

Slagel et al.

[11] 3,715,343

[45] Feb. 6, 1973

[54] POLYMERS OF VINYL AMINIMIDES

[75] Inventors: Robert C. Slagel, Pittsburgh, Pa.; Billy M. Culbertson, Burnsville, Minn.

[73] Assignee: Ashland Oil, Inc., Houston, Tex.

[22] Filed: Aug. 11, 1971

[21] Appl. No.: 170,989

Related U.S. Application Data

[60] Continuation-in-part of Ser. No. 24,948, March 20, 1980, Pat. No. 3,664,990, which is a division of Ser. No. 636,273, May 5, 1967, Pat. No. 3,527,802.

[52] U.S. Cl. ..........260/88.1 PN, 117/124, 117/132, 117/161, 260/32.8 N, 260/63 N, 260/77.5 AT, 260/77.5 CR, 260/78.5 R, 260/79.3 M, 260/80 P, 260/80.3 N, 260/82.1, 260/85.5 AM, 260/85.7, 260/87.5 R, 260/87.7, 260/88.1 R, 260/89.7 R

[51] Int. Cl. ...........................C08f 3/84, C08f 15/02

[58] Field of Search.............................260/89.7 R, 260/80.3 N, 80 P, 88.1 PN

[56] References Cited

UNITED STATES PATENTS

| | | | |
|---|---|---|---|
| 2,326,287 | 8/1943 | Coffman | 260/86.1 N |
| 2,334,476 | 11/1943 | Coffman | 260/86.1 N |
| 3,527,802 | 9/1970 | Slagel | 260/87.5 |

*Primary Examiner*—Harry Wong, Jr.
*Attorney*—William Kammerer et al.

[57] ABSTRACT

Linear addition of polymers having pendant quaternized aminimide groups are provided by homo- or copolymerizing a quaternary derivative of a N,N-disubstituted acid hydrazide wherein the acyl moiety is acrylyl, methacrylyl, or crotonyl. The quaternized aminimide groups of such polymers are neutralized and then converted to isocyanate groups. Polyurethane and polyurea cross-links can be prepared from the resultant polyisocyanates having utility in molding, surface coating, adhesive and the like applications.

7 Claims, No Drawings

POLYMERS OF VINYL AMINIMIDES

CROSS-REFERENCE TO RELATED APPLICATIONS

This application is a continuation-in-part of Ser. No. 24,948, filed Mar. 20,1970, now U.S. Pat. No. 3,664,990, which is a divisional of Ser. No. 636,273, filed May 5, 1967, now U.S. Pat. No. 3,527,802.

BACKGROUND OF THE INVENTION

1. Field of the Invention

This invention relates to linear polymers having pendant aminimide groups attached to carbon atoms constituting the backbone of the polymer and to the corresponding polyisocyanates derived therefrom.

2. Description of the Prior Art

It has recently been found that the tertiary aminimide grouping; i.e., the $-CON^+N^--$ structured radical, can be thermolytically rearranged to the isocyanate (-NCO) radical. One approach of utilizing this technology in the polymer arts is exemplified in U.S. Pat. No. 3,485,806 and the herein cross-referenced U.S. Pat. No. 3,527,802. Both of these patents are commonly directed to vinyl aminimides and to the addition polymerization products derived therefrom. As disclosed in these patents, the contemplated polyaminimide products can be thermolytically rearranged so as to convert their respective aminimide residues to isocyanate residues, thus providing a particularly advantageous form of a polyisocyanate useful in forming a variety of thermoset polyurethane and polyurea systems.

As is well know in the segment the polymer art concerned with the addition copolymerization reaction, each vinyl or vinylidene monomer exhibits a given reactivity rate in the course of effecting the copolymerization thereof. This rate is a function of the general reactivity of the monomer and the polar nature thereof. Since these parameters are constant for any particular monomer, the reactivity rate associated therewith is, as indicated, uniquely different in each case. The relationship which the respective reactivity rate of the comonomers bears to each other in turn governs the type of copolymer produced therefrom.

The vinyl aminimides exemplified in the above-cited prior art by virtue of having varied types of amino nitrogen substituents, possess somewhat different reactivity rates. However, these monomers are related anough in their structural makeup that they will provide like copolymers having a somewhat similar distribution profile of aminimide residues along the polymer chain. In some instances, elaborate procedures and/or the use of specific coupling comonomers must be observed in making certain copolymers thereof, notably those containing styrene, wherein the pendant isocyanate precursor groups are uniformly distributed along the polymer chain. Accordingly, the practice of this invention among other advantages, permits the realization of this desideratum without having to resort to any special processing techniques.

SUMMARY OF THE INVENTION

In accordance with this invention, linear addition polymerization products are provided having pendant quaternized aminimide groups attached to carbon atoms constituting the backbone of the polymer by either homo- or copolymerizing a quaternized vinyl aminimide corresponding to the formula:

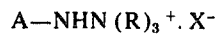

$$A-NHN(R)_3^+ \cdot X^-$$

wherein A represents the acrylyl, methacrylyl or crotonyl radical;

R represents a lower alkyl, hydroxyalkyl or phenyl radical; and

X represents the anion of a strong acid.

The foremost advantage residing in the practice of this invention is that the copolymers concerned can be obtained having neutral aminimide residues substantially uniformly distributed along the polymer chain. Another related advantage is that such copolymers can be obtained employing as comonomers those vinyl compounds which will not readily copolymerize with the neutral form of the vinyl aminimide. A still further important advantage of this invention is that it permits the production of homo- and copolymers of a tertiary amine acrylimide without the necessity of starting with this monomer species which is especially difficult to prepare as such.

DESCRIPTION OF THE PREFERRED EMBODIMENTS

While the present invention is broadly directed to homo- as well as copolymers derived from the quaternized aminimides noted above, this description will be addressed to the preferred aspect thereof, namely, that of preparing copolymers. The term "copolymer" as used herein, contemplates those addition products derived from the quaternized aminimides by polymerizing with at least one other ethylenically unsaturated monomer copolymerizable therewith.

Two prior art methods are available for obtaining the applicable quaternized vinyl aminimides. One of these methods consists of the classical method of preparing the hydrazinium salt of a carboxylic acid. In context, this procedure involves initially condensing a halide, preferably the chloride of the vinyl acid, with an unsymmetrical disubstituted hydrazine and thereupon treating the resultant acid hydrazide with a quaternizing agent. Suitable quaternizing agents include the alkyl halides, particularly the lower alkyl chlorides, as well as the aromatic sulfonic acids conventionally employed for this purpose. Since the substituents of the amino nitrogen atom eventually form the leaving group in the conversion of the aminimide to an isocyanate, it is preferred to employ a lower alkyl halide as the quaternizing agent. For the same reason, the substituted hydrazine desirable are those having lower alkyl substituents. Further details relative to this method of deriving the quaternized vinyl aminimides are set forth in U.S. Pat. No. 3,527,802.

A different and more economically attractive method for deriving the quaternized aminimides contemplated herein consists of first preparing the neutral aminimide in accordance with the process disclosed and claimed in U.S. Pat. No. 3,345,806, followed by forming the salt thereof by treatment with a strong acid. The referred-to synthesis consists of reacting a lower alkyl ester of the selected vinyl acid with an unsymmetrically disubstituted hydrazine and a lower alkylene oxide. A variation of the foregoing method is that of first forming a hydroxy aminimine by reaction of the unsymmetrical disubstituted hydrazine with an alkylene oxide and thereupon reacting this intermediate with the vinyl acid ester. As noted in connection with the classical procedure outlined above for deriving the quaternized vinyl aminimides, it is preferred to use substituted hydrazines wherein the substituents are lower alkyl and likewise it is preferred to use a lower alkylene oxide. Further details relative to this method can be found in the cited patent.

The neutral vinyl aminimide obtained in accordance with the foregoing epoxide route can be readily converted to the quaternary form by treating with a strong acid having preferably either a halide, sulfate or sulfonate anion. In addition to acids of the foregoing type, strong organic acids such as the trihaloacetic acids, e.g., trifluoroacetic acid, para-toluene sulfonic acid, methane sulfonic acid and the like can be used. The acid used in forming the hydrazinium salt is preferably a monobasic acid since a dibasic acid will lead to cross-linking during polymerization with attendant viscosity problems. The hydrazinium salt formation can be most conveniently carried out in an alcoholic solvent medium. Suitable solvents for this purpose include the lower alkanols, the glymes and the like.

As pointed out hereinabove, the gist of the present invention in context of the preferred aspect thereof consists of polymerizing the contemplated quaternized vinyl aminimides with a comonomer or comonomers containing a polymerizable

group. The applicable comonomers accordingly embrace a plurality of vinyl and vinylidene compounds.

An exemplary enumeration of suitable vinyl and vinylidene compounds for copolymerizing with the quaternized vinyl aminimide include: the vinyl halides, e.g., vinyl chloride, vinyl fluoride, vinyl bromide, vinylidene chloride, etc.; including the vinyl pseudo halides, e.g., acrylonitrile and methacrylonitrile; the unsymmetrical dialkyl substituted ethylenes, e.g., isobutylene, isooctene, isooctadecene; the conjugated dienes, e.g., isoprene, butadiene; the alpha olefins, e.g., 1-butene, 1-hexene, 1-octene, 1-dodocene, 1-hexadecene, 1-octadecene; the vinyl ethers, e.g., methyl-, ethyl-, propyl-, butyl-, isobutyl-, lauryl-, and stearyl vinyl ether; the vinyl esters, e.g., vinyl acetate, vinyl propionate, vinyl butyrate, vinyl laurate, vinyl stearate, etc.; the aromatic vinyl compounds, e.g., styrene, alpha methyl styrene, chloro-styrene, vinyl toluene and vinyl naphthalene; the vinyl derivatives of heterocyclic compounds, e.g., vinyl pyridine, N-vinyl pyrrolidine, N-substituted N-vinyl piperidine and the N-vinyl oxazolidones; acrylamide and the N-substituted acrylamides; the acrylates, halo- and methacrylates, e.g., ethyl acrylate, butyl chloroacrylate, hexyl acrylate, decyl acrylate, stearyl acrylate, behenyl acrylate, methyl methacrylate, octyl methacrylate, lauryl methacrylate, eicosyl methacrylate; the vinyl ketones, e.g., methyl vinyl ketone, hexyl vinyl ketone, lauryl vinyl ketone, etc.; esters of alpha, beta-ethylenically unsaturated polycarboxylic acids, e.g., dimethyl maleate, dibutyl fumarate, dimethyl itaconate, etc.; vinyl silanes, vinyl trifluoro-acetate, 2,2,2 trifluoroethyl acrylate, etc.

The copolymerization of the quaternized aminimide with the vinyl or vinylidene comonomer can be carried out in bulk, in solution or in an aqueous medium. Solution polymerization is preferred. A variety of organic solvents of the aromatic and aliphatic types as well as mixtures thereof with a polar solvent are applicable. Aromatic solvents such as benzene, toluene, xylene, etc., and combinations thereof with the polar solvent, e.g., a lower alkanol, are preferred. Because of the relative stability of the quaternized aminimide grouping, elevated temperatures of as high as 150°C. can be used in carrying out polymerization.

The copolymerization can be effected by heating alone but is preferably initiated by the use of a conventional radical forming initiator. In some instances, it is desirable to use the free radical forming initiator in combination with a reducing agent or promoter. Such techniques are well understood in the polymerization art. The ratio of the aminimide quaternary monomer to the comonomer or comonomers copolymerizable therewith and the molecular weights of the attendant copolymers can be varied extensively, depending in the main upon the particular use application envisioned for the final product.

The pendant quaternized aminimide groups of the copolymerization products obtained in the foregoing manner can be converted to the neutral form by treatment with a strong base. The alkali metal hydroxides as well as the lower alkoxides of the alkali metals represent suitable bases for this purpose. The neutralization procedure can be conveniently carried out by treating the polymer solution with an alcoholic solution of the selected base. A particularly advantageous method for neutralizing the polymer is to percolate a wet solution thereof through a bed of a basic or anion exchange resin. This neutralization technique has proved to be particularly effective and has the advantage of obviating the formation of salts as occurs in using the alkali metal bases with the attendant steps required to effect purification.

The polyaminimide outlined above can, as previously indicated, be thermally rearranged to provide the corresponding polyisocyanate. Thermolysis of the polyaminimide can be effected simply by heating at a temperature of from about 120°–200°C. and more preferably between about 140°–180°C. In the rearrangement of the aminimide to the isocyanate, a tertiary amine is evolved. Accordingly, facilitating the removal of the tertiary amine promotes the thermolysis reaction. This can best be accomplished by heating a solution of the polyaminimide and effecting the co-distillation of a fraction of the evolved amine and the solvent. For the purpose of carrying out the thermolysis reaction within the preferred temperature range, the use of a solvent such as xylene, mesitylene or diethyl benzene is recommended. The extent of conversion of the aminimide groupings can be followed by noting the reduction of the infrared spectrum at 1580 cm$^{-1}$ and the corresponding increase of the isocyanate band at 2270 cm$^{-1}$ or by wet analysis of the isocyanate content. Substantially complete conversion of the aminimide groups to isocyanate groups can be readily achieved in this manner. An alternate way of thermolyzing a polyaminimide consists of heating a film thereof at a temperature within the range indicated above. This manner can be advantageously availed of in preparing thermoset polyurethane or polyurea type surface coating compositions. In the working examples, illustrations of this manner of employing a polyaminimide will be set forth.

In order to illustrate to those skilled in the art the best mode contemplated for carrying out the present invention, the following working examples are set forth. As indicated, these examples are presented primarily by way of illustration and accordingly, any enumeration of details contained therein should not be construed as a limitation on the invention except to the extent expressed in the appended claims. All parts and percentages given are on a weight basis unless otherwise indicated.

EXAMPLE I

This example will serve to illustrate the preparation of monomers useful in the practice of the invention.

Part A

Preparation of 1, 1, 1-trimethylacrylylhydrazinium chloride

Into a suitable reaction vessel equipped with a stirrer and reflux condenser and containing 900 parts deionized water and 240 parts (4.0 mol) of unsymmetrical dimethyl hydrazine were charged 344 parts (4.0 mol) of methylacrylate. Upon abatement of the considerable exotherm which developed, the reaction mixture was allowed to cool to room temperature and stirred for 12 hours. The reaction mixture was then evaporated to a pale yellow solid which was recrystallized from acetone-methanol to give 437 parts (92 percent yield) of 1, 1-dimethylpyrazolinium 3-oxide, m.p. 89.5°–90.5°. The carbonyl absorption in the infrared spectrum at 1585 cm$^{-1}$ was consistent with reported absorptions for cyclic aminimides.

The cyclic aminimide in the amount of 114 parts (1 mol) was charged to a distillation apparatus and heated in vacuo at 250°C. The material distilled at 120°C. (1.4 mn) and solidified upon cooling to yield 70 parts (62 percent of theory) of 1,1-dimethyl-2-acrylhydrazine, m.p. 84°. Infrared analysis showed absorption bands at 3220, 1675, 1640 and 1555 cm$^{-1}$.

Into a glass-lined autoclave were charged 525 parts of methylalcohol, 100 parts of the 1,1-dimethyl-2-acrylhydrazine and about 100 ppm of 2,2-diphenyl-1-picrylhydrazyl. Methyl chloride was charged until the autoclave pressure rose to 55 psi. The reaction mixture was heated overnight at 70°C. cooled, and the volume reduced about 70 percent. The product was precipitated with chloroform, washed with ether and dried to obtain 73 parts (52 percent yield) of 1,1,1-trimethylacrylylhydrazinium chloride, m.p. 194°–195°.

Part B

Preparation of 1,1,1-trimethylmethacrylylhydrazinium chloride

Into a solution of 1,1,1-trimethylammonium-N-methacryloylimine (prepared in accordance with Example I of U.S. Pat. No. 3,527,802) in absolute methylalcohol was added excess hydrogen chloride by means of a gas sparger. The solution was stirred during the addition of the gas and the temperature maintained below about 40°C. by cooling. The solution was reduced to a non-volatile residue on a flash evaporator, redissolved in chloroform and precipitated with benzene. Nearly quantitative yield of the hydrazinium salt was obtained having a melting point of 139°–139.5°.

Part C

Preparation of 1,1-dimethyl-1-(2-hydroxypropyl)methacrylylhydrazinium chloride

A solution of 1,1-dimethyl-(2-hydroxypropyl)ammonium-N-methacryloylimine (prepared in accordance with Example III of U.S. Pat. No. 3,485,806) and methanol was purged with nitrogen for about 15 minutes before an excess of hydrogen chloride gas was slowly bubbled through the solution over a 3–4 hour period. The reaction mixture was concentrated at reduced pressures and the viscous water-white residue dried in the presence of caustic in vacuo to yield a brittle, glassy product exhibiting the expected analysis data.

EXAMPLE II

Homopolymer of 1,1,1-trimethylammonium-N-acryloylimine

A 60 ml serum bottle was charged with 5 g. of the hydrazinium chloride of Part A of Example I, 10 ml of anhydrous methanol and 5 mg. of azobisisobutyronitrile (AIBN). The bottle was flushed with nitrogen, sealed and placed in a shaker bath at 70°C. for 20 hours. The alcoholic solution was poured into 30 ml of vigorously stirred acetone. The white precipitate was collected and washed several times with acetone to obtain 3.5 g. (70 percent yield) of polymer. After dissolving in methanol, reprecipitating with acetone, and drying in vacuo, the polymer was shown to be free of monomer by thin layer chromatography (tlc). The polymer exhibited an inherent viscosity of 1.56 in methanol. The IR spectrum of a film of the polymer exhibited the expected strong amide absorption bands at 3400, 1700 and 1560 cm$^{-1}$.

The polymer was dissolved in wet methanol and the solution fed through a column of basic ion exchange resin. The IR spectrum of the recovered and dried polymer exhibited the typical strong aminimide absorption band at 1570 cm$^{-1}$ and no amide absorption bands.

EXAMPLE III

Copolymer of 1,1,1-trimethylammonium-N-methacryloylimine and styrene

The hydrazinium salt of Part B of Example I in the amount of 5 g. was charged into a 100 ml serum bottle along with 20 g. styrene, 40 ml of N,N-dimethylformamide and 0.2 g. AIBN. After a brief nitrogen sparge, the bottle was sealed and placed in a shaker bath for 20 hours at 70°C. A small sample of the polymerization reaction mixture was poured into water and a polymer collected, washed with water and dried in vacuo. The IR spectrum thereof contained strong bands indicative of the two monomer residues.

The remainder of the viscous polymerization solution was poured slowly into a vigorously stirred aqueous potassium hydroxide solution (0.5 N) and the precipitated polymer was collected, washed with water until neutral and air dried to obtain 24 g. yield of crude polymer. The polymer was dissolved in acetone, filtered, precipitated into water, collected and dried in vacuo to obtain a purified polymer having an inherent viscosity of 0.18 in chloroform. The IR spectrum of the polymer showed a strong band at 1565 cm$^{-1}$.

The polymer yield was then dissolved in 100 ml of xylene and the resultant solution refluxed for 4 hours under a strong nitrogen stream. During thermolysis, copious amounts of amine evolved from the solution. The polymer solution analyzed 4.72% NCO (theory 4.96 percent). An isolated polymer sample was obtained and such exhibited an inherent viscosity of 0.23 in chloroform. The xylene solution of the poly(styrene-co-isopropenyl isocyanate) exhibited excellent shelf stability on storage in metal containers.

EXAMPLE IV

This example illustrates the use of the monomer 1,1,1-trimethyl-acrylylhydrazinium chloride to prepare a thermoset polyurethane coating composition.

Into a suitable reaction vessel equipped with a stirrer and reflux condenser were charged 42 parts styrene, 31 parts n-butyl acrylate, 10 parts hydroxyethyl acrylate, 13 parts of the hydrazinium salt of Part A of Example I, 16 parts n-butyl alcohol and 1.5 parts AIBN. With stirring, the polymerization was carried out under nitrogen for 4 hours at 90°C.

The polymerization reaction mixture was diluted with wet tetrahydrofuran and the solution fed through a basic ion exchange column. After filtration and concentration, the polymer solution was poured into ether to precipitate the polymer. The aminimide polymer was dissolved in acetone at 50 percent solids and the solution employed to coat glass plates. The coated glass plates were heated for 30 minutes at 160°C. causing brisk evolution of trimethylamine. The resultant films of about 3 mil thickness were found to have an average Sward hardness of 18 and Tukon reading of 12.7. The IR spectrum of the thermolyzed films exhibited a weak band at 2260 and at about 1700 cm$^{-1}$ indicative of isocyanate and urethane residues but no band at 1570 cm$^{-1}$. The baked films were insoluble in chloroform, acetone, xylene, etc., and exhibited good adhesion to the glass.

EXAMPLE V

Into a suitable reaction vessel equipped with a stirrer, thermometer and reflux condenser were charged 71 parts of the hydrazinium salt (DHA-HCl of Part C of Example I, 177 parts of styrene and 250 parts of ethyl Cellosolve. The reaction mixture was heated to 80° and 5 parts of AIBN were added following which the temperature was permitted to rise to 100°C. After heating for one hour, an additional 10 percent of the initiator was added. Following a total reaction time of 4 hours at 100°C., the viscous solution was allowed to cool to room temperature.

Three samples of the copolymer were respectively mixed with a commercial polyepoxide resin, bis-(2-hydroxyethyl) adipate (BHA) and bis-(2-hydroxyethyl) dimerate (BHD) on the basis of 1.0 equivalent of the cross-linking agent per equivalent of the DHA-co-styrene polymer. Films of the thermosetting compositions were deposited on steel and glass substrates and the composites baked at 160°C. for 30 minutes. Pertinent evaluation data for the thermoset films are listed in the following Table I.

TABLE I

Composites

15 Mole % DHA:Styrene With 1.0 Equiv. of Co-Reactant

| Co-Reactant | Sward | Tukon | Adhesion | Impact Face | Reverse |
|---|---|---|---|---|---|
| Epon 812* | 62 | 18.9 | Ex. | 160 | 140 |
| BHA | 64 | 15.7 | Good | 160 | 130 |
| BHD | 26 | 4.59 | Good | 160 | 120 |

*Shell Chemical Co.

What is claimed is:

1. An addition homo- or copolymer of a quaternized vinyl aminimide having the formula:

$$A-NHN(R)_3{}^+ \cdot X^-$$

wherein A represents the acrylyl, methacrylyl or crotonyl radical, R represents a lower alkyl, hydroxyalkyl or phenyl radical; and X represents the anion of a strong acid.

2. An addition homo- or copolymer in accordance with claim 1 wherein the A of the formula of said quaternized vinyl aminimide represents the acrylyl radical.

3. An addition copolymer in accordance with claim 2 wherein the comonomer comprises styrene.

4. A homo- or copolymer in accordance with claim 1 wherein the A of the formula of said quaternized vinyl aminimide represents the methacrylyl radical.

5. An addition copolymer in accordance with claim 4 wherein the comonomer comprises styrene.

6. An addition homo- or copolymer in accordance with claim 1 wherein the A of said formula represents the crotonyl radical.

7. An addition copolymer in accordance with claim 6 wherein the comonomer comprises styrene.

* * * * *